United States Patent [19]
Meiners

[11] 3,811,387
[45] May 21, 1974

[54] METHOD AND APPARATUS FOR MINIMUM TILLAGE FARMING
[75] Inventor: Elmo R. Meiners, Anchor, Ill.
[73] Assignee: M & W Gear Company, Gibson City, Ill.
[22] Filed: Jan. 9, 1973
[21] Appl. No.: 322,224

Related U.S. Application Data
[63] Continuation-in-part of Ser. No. 1,691, Jan. 9, 1970, abandoned.

[52] U.S. Cl. ................................................. 111/1
[51] Int. Cl. ......................................... A01c 19/00
[58] Field of Search ................................. 111/1, 80

[56] References Cited
UNITED STATES PATENTS
2,787,864  4/1957  Eck et al. ............................. 111/1 X OTHER PUBLICATIONS
McGraw–Hill Encyclopedia of Science and Technology, Vol. 5, pp. 239–240 (1966).
The 1957, of Agriculture, 2 1957, Soil, p. 223.

Primary Examiner—Stephen C. Pellegrino
Attorney, Agent, or Firm—Molinare, Allegretti, Newitt & Witcoff

[57] ABSTRACT

Tillage required and fertilizer and herbicide consumption is minimized by placing fertilizer deep in the soil in the fall without thoroughly mixing the fertilizer and soil. The fertilizer is placed by first forming a deep channel, placing the fertilizer in the channel and forming a mound of dirt over the imbedded fertilizer. In the spring, seeds are planted in the top portion of the same mound. This method results in diminished weed growth and increased crop growth while using less amounts of fertilizer and herbicides. The same basic mound structure is then maintained from year to year. The tillage, fertilization and cultivation are performed with a single, combination farm implement comprising a platform having a number of plows, bedders and fertilizer applicators mounted thereon in the fall. In the spring, the same platform has spreaders, planters and bedders for planting mounted thereon.

8 Claims, 11 Drawing Figures

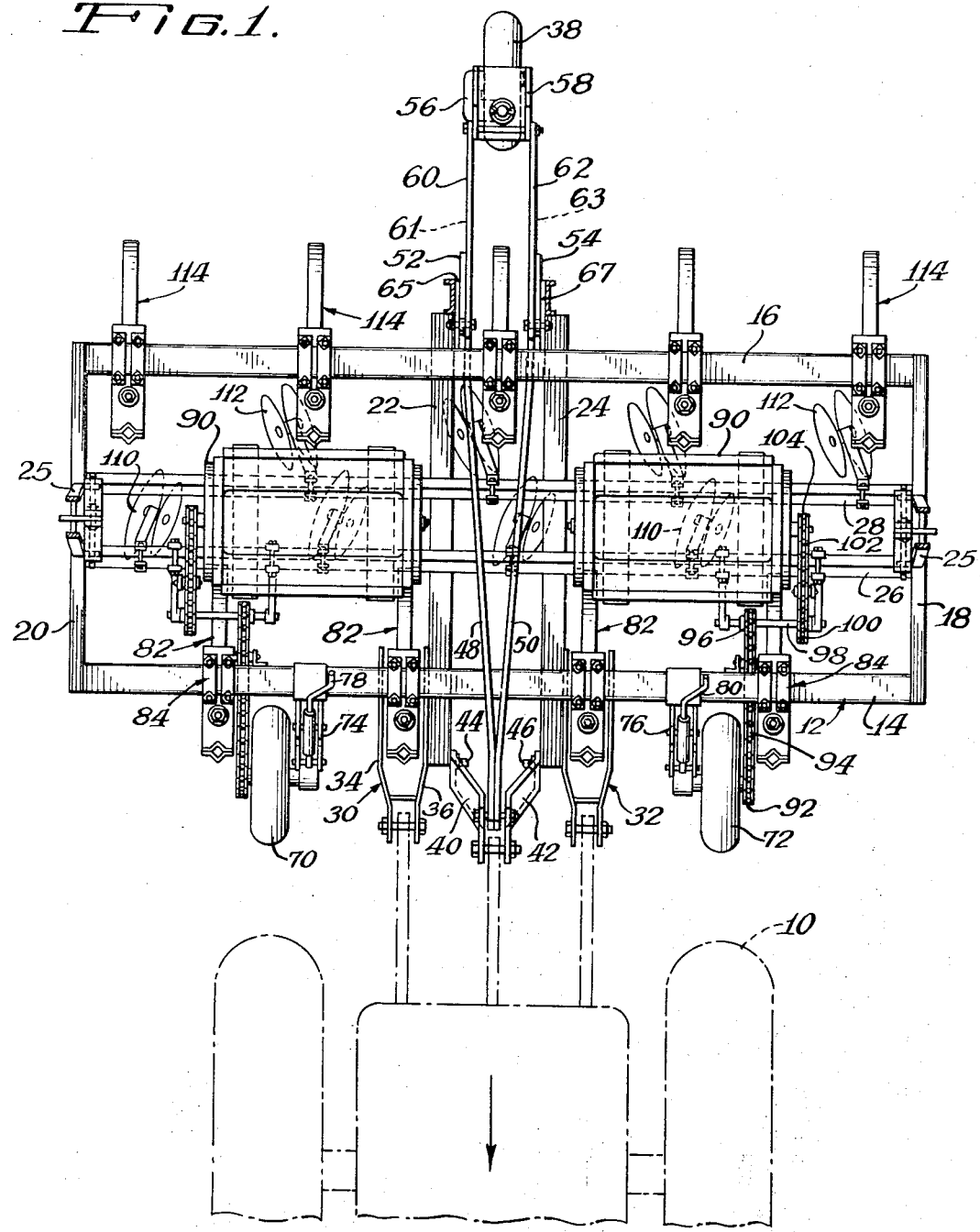

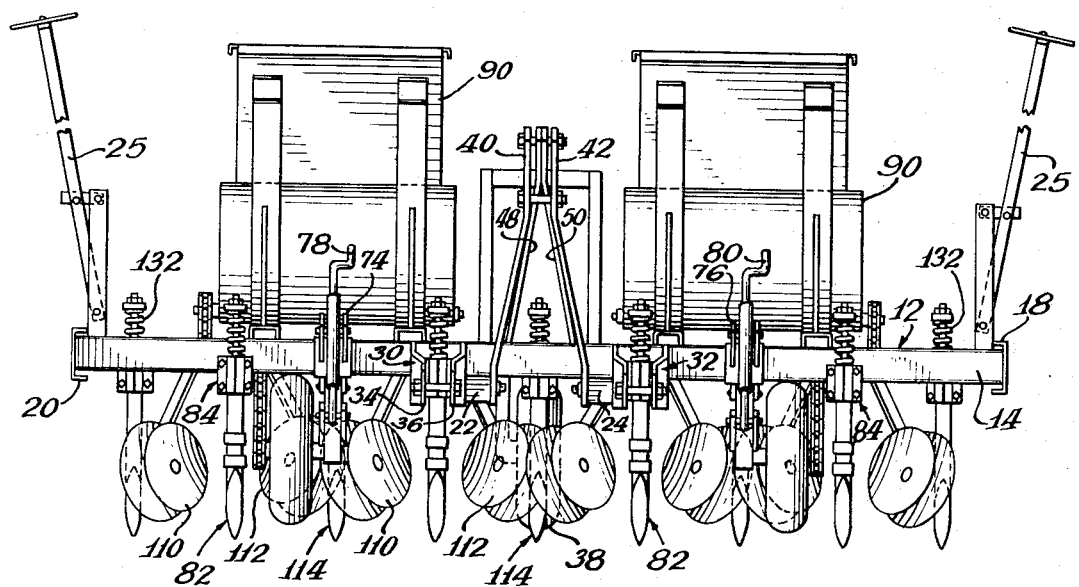
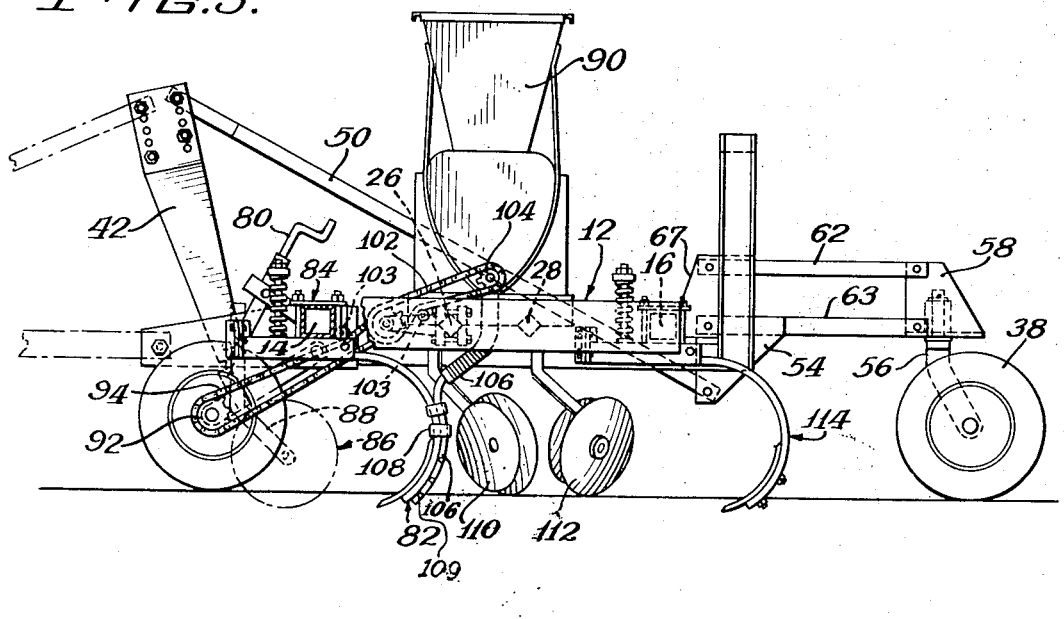

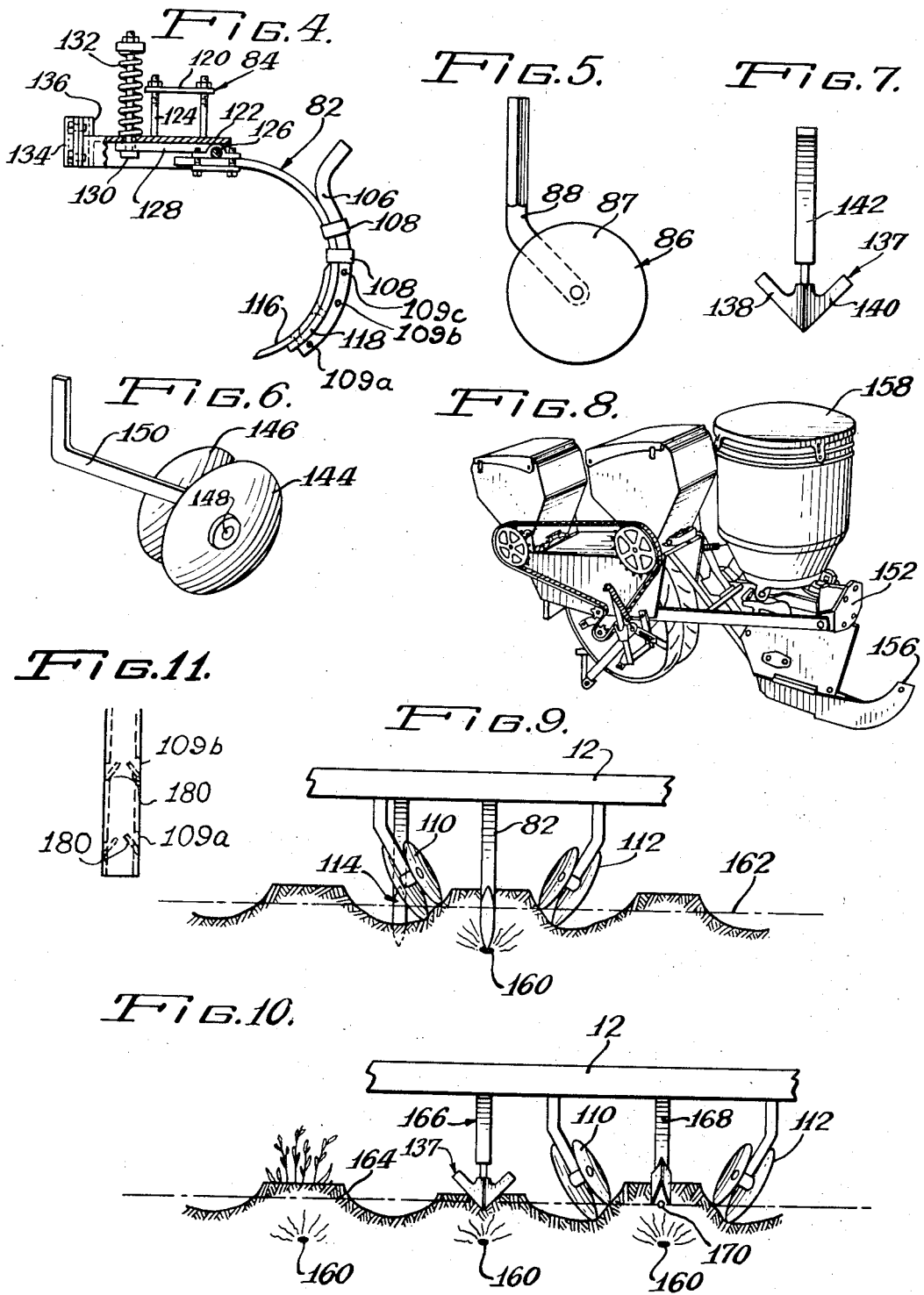

3,811,387

METHOD AND APPARATUS FOR MINIMUM TILLAGE FARMING

CROSS REFERENCE TO RELATED APPLICATION

This application is a continuation-in-part of my co-pending application Ser. No. 1,691, filed Jan. 9, 1970 now abandoned, the teachings of which are incorporated by reference.

BACKGROUND OF THE INVENTION

This invention relates to an improved method and apparatus for farming.

With the advent of high labor costs and low farm prices, the necessity for efficiency on a farm and the size of profitable farms has been increasing. As a result, individual farmers are now able to cultivate vast areas with greater efficiency and higher yields than did their predecessors. It is a purpose of the present invention to provide an even more efficient method and apparatus for farming which will enable a farmer to cultivate even larger areas of land more efficiently, preferably with a reduced number of farm implements and operations.

In the past, cultivation of a field required at least plowing, harrowing, raking, planting and cultivating operations. In addition numerous other operations could be performed on the field such as fertilizing, applying herbicide, discing, cultivating the plants once they are sprouted, and bedding. Normally, for each operation a separate pass is required over the field. To overcome the necessity of numerous, separate passes, farmers began to pull a series of implements together such as a disc and a harrow thus combining various operations.

In addition to the separate passes required over a field for each tilling operation, a large inventory of equipment is required to accomplish all the operations. Thus, a plowing operation requires a rather sophisticated plowing tool which may have five or more blades. A separate harrow, planter and other farm implements must also be provided and must be sufficiently large for efficient operation. The overall result is that a farmer requires a large inventory of big and expensive machinery which is utilized a few times a year. The machinery otherwise lies dormant until its next seasonal use requirement.

Further, farmers, in an attempt to produce higher yields have resorted to the extensive use of fertilizer and herbicides. As now practiced, the fertilizer is admixed with the top portion of the soil. As a result, the fertilizer is readily leached from the soil by rain run off and the fertilizer fertilizes weeds and other undesired plant growth as well as the desired crops. As a consequence, the farmer must use more fertilizer and must apply herbicides to control weed growth. Since fertilizer and herbicides often contain chemicals which are harmful to the environment, i.e., phosphates, it is ecologically desirable to use as little of these materials as possible.

In addition, it has been recognized to use starter fertilizer at levels six inches below the seed bed at the time a crop is planted in the spring. This method is usually confined to starter fertilizer only and has not been extended to all fertilizer applications. Further, this method is used only in the spring when the crop is planted. See McGraw-Hill Encyclopedia of Science in Technology, Volume 5, pp 239-240 (1966).

OBJECTS OF THE INVENTION

It is an object of this invention to provide an improved method of farming.

It is another object of this invention to provide a method of farming wherein the fertilizer is not readily leached from the soil and water run-off is controlled.

It is another object of this invention to provide a method of farming utilizing lesser amounts of fertilizers and herbicides without lowering yield.

It is a further object of this invention to prepare the soil in the fall for spring seed planting.

It is another object of this invention to provide an improved method of farming wherein a minimum of farm implements are required.

It is another object of this invention to provide an apparatus to chisel and condition the soil in the fall which can also be used, with minor modifications, for spring planting.

Still another object of the present invention is to provide a single farm implement adapted for use in several farm operations and which eliminates the necessity and expense of a large inventory of farm implements which remain idle and non-productive during most of the year.

Another object of the present invention is to provide a farm implement adapted to place fertilizer adjacent to the tip of a chisel plow deeply beneath the soil and to subsequently provide a soil bed or mound over the chiseled row so that the fertilizer remains deeply placed. Plant roots, as they germinate in the spring, will then seek the deeply placed fertilizer and moisture, thereby strengthening the root system and plant and producing greater yields. Besides providing better drainage and water retention, the beds per se dry more quickly following rain. This permits earlier planting in the beds. The bed also exposes three sides to the sun thus providing a beneficial effect on germination and growth of seeds planted in a bed.

These and other objects, advantages and features of the present invention will be set forth in greater detail in the description which follows.

SUMMARY OF THE INVENTION

Thus, it has been discovered that the amount of fertilizer and herbicides needed to provide a given yield are greatly reduced if, in the fall, before spring planting, the fertilizer is placed in a channel deep in the soil and then covered with a mound of soil. In the spring, seeds are planted in the top of the mound which ultimately germinate and produce roots which seek the fertilizer.

In an embodiment, therefore, the present invention relates to an improved method of farming and soil tillage comprising, in the fall, of forming a deep channel in the soil which preferably extends below the normal soil grade and then placing a plant food additive in the bottom of the channel. Preferably, any crop trash and residue present on the soil surface is chopped and shredded prior to the formation of the channel. The channel is then filled with soil, preferably without an intimate admixing of the soil and plant food additive, and a mound of dirt, which extends above the normal grade of the soil, preferably substantially trapezoidal in cross section, is formed over the filled channel to bury the fertilizer at a depth greater than 6 inches. In the spring, seeds are planted in the top portion of the mound at their normal planting depth and substantially directly above the plant additive but spaced apart therefrom. The mound need not be reworked, tilled or refarmed but it can be if desired. If a crust has formed on the mound over the winter, it is usually broken prior to seeding. Further, this same mound is then used in subsequent years for future plantings and fertilization.

Preferably, this method of farming is effected with a single, combination low tillage farm implement having mounted thereon equipment necessary to effect the seasonal steps described. However, it is within the scope of the invention to utilize two or more farm implements.

More specifically, the fertilizer is spaced in varying quantities over a 4 inches to 18 inches depth in the channel formed by the chisel plow with the majority of the fertilizer placed at a depth of about 12 inches to 18 inches. As used herein "depth" refers to the distance below the top of the mound ultimately formed and the bottom of the channel. In a particularly preferred embodiment, about 10%–30%, preferably 20% of the fertilizer is deposited at about 3 inches to 4 inches depth; about 10%–30%, preferably 20%, is deposited at about a 8 inches to 12 inches depth; and about 50%–70%, preferably 60%, is deposited at about a 14 inches to 18 inches depth.

As used herein, food additive refers to a compound that enhances and facilitates the germination of desired seed crops, provides nutrition for future growth and improves the texture and/or biological activity of the soil. Fertilizer is a preferred food additive and need not be limited to starter fertilizer. Other additives include, for example, limestone when a crop is changed from corn to beans. Suitable fertilizers include ammonium nitrate, with or without limestone; ammonium phosphate; calcium cyanamide; calcium nitrate; sodium nitrate; urea; aqueous or anhydrous ammonia; superphosphates; carnallite; potassium chloride etc. as well as minerals containing the elements magnesium, boron, manganese, zinc, copper, molydenum, etc.

By fertilizing deep in the fall, the fertilizer has an opportunity to react or become fixed with the soil before the spring planting. This reaction can take place to the exclusion of adverse utilization of the fertilizer by weeds since the weeds are dormant over the winter months.

Heretofore, it has been assumed that the fertilizer would be leached from the soil during the intervening winter months. However, it has been found that by deep fertilizing, enhanced product yields are produced and less fertilizer is required. It appears that the potassium and phosphorus in fertilizer becomes thoroughly dispersed and adsorbed on colloidal clay particles. Also, the activity of microorganisms transforms nitrogen, sulfur and phosphorus components into forms loosely adsorbed on colloidal soil particles which are available to the plants.

In addition, when phosphates are placed on or closely to the surface of the soil, they quickly form insoluble compounds which do not penetrate deep where they are required to stimulate root development. By placing the phosphates deep, this insoluble formation is avoided and the phosphates are available for root growth.

Thus, it is extremely important that the food additive, i.e., fertilizer, be placed deep in the fall. Further, the fertilizer and seed mound formation are done in the fall when the soil is dry and readily tilled. As a result, in the spring when the soil condition is unpredictable, much of the field work will have already been completed and all that is required is planting of seeds. This enables the farmer to get his crops in as quickly as possible and avoid, as near as possible, any undue delays such as from an unpredictable wet spring.

BRIEF DESCRIPTION OF THE DRAWINGS

In the detailed description which follows, reference will be made to the drawings comprised of the following figures which illustrate a preferred apparatus for effecting the present invention:

FIG. 1 is a top plan view of the preferred farm implement to be used in practicing the present invention;

FIG. 2 is a front view of the implement shown in FIG. 1;

FIG. 3 is a side view of the implement shown in FIG. 2;

FIG. 4 is a detailed view of a typical chisel plow construction and fertilizer applicator for applying liquid fertilizer utilized with the implement preferably used in the present invention;

FIG. 5 is a colter utilized with the implement;

FIG. 6 is a bedder utilized with the implement;

FIG. 7 is a typical cultivator sweep utilized with the implement;

FIG. 8 is a typical planter unit utilized with the implement;

FIG. 9 is a schematic, cross sectional diagram of the implement illustrating fall plowing and fertilizing; and FIG. 10 is a schematic cross sectional view of the implement as it is utilized for spring planting; and FIG. 11 is an enlarged, cross sectional diagram of a fertilizer applicator for dispensing solid fertilizer.

DETAILED DESCRIPTION OF THE INVENTION

Referring first to FIGS. 1, 2, and 3, there is shown a preferred embodiment of the farm implement assembled for fall plowing and fertilizing. The implement of the invention is attached by means of a three-point hitch at the rear of a tractor 10 shown in phantom in FIG. 1.

One of the basic components of the implement is the platform or frame 12 which includes a front transverse frame member 14 and a rear transverse frame member 16. The front and rear frame members 14 and 16 are interconnected at their outer ends by means of end frame members 18 and 20. To provide further rigidity to the platform 12 and also to provide for attachment of a hitch mechanism, to be described more fully below, first and second interior frame members 22 and 24 respectively are included. The interior frame members 22 and 24 interconnect the transverse frame members 14 and 16 and extend forwardly and rearwardly of the platform as defined by the frame members 14 and 16.

The platform 12 also includes a pair of interior transverse frame members 26 and 28 which extend between the end frame members 18 and 20. All the frame members as described above are welded together to define the basic frame or platform 12. Optionally included on the frame is an outrigger boom or marker pole 25 for marking rows.

Incorporated with platform 12 is a three-point hitch arrangement. The three-point hitch arrangement includes first and second hitching arms 30 and 32 which are welded to the front frame member 14 and extend in a forward direction from the frame member 14. The hitching arms 30 and 32 extend forward for a distance sufficient to easily connect with conventional three-point hitches provided with tractors so that the implement of the present invention will not interfere with the operation of the tractor 10. Each hitching arm 30 is formed by a pair of parallel plates as at 34 and 36 for arm 30. The plates 34 and 36 are sufficiently spaced so that a tool may be positioned between the plates 34 and 36, as will be more fully described below.

Positioned between the arms 30 and 32 and attached to the interior frame members 22 and 24 is a center arm assembly for the three-point hitch. The center arm assembly operates in combination with a trailing wheel 38 attached to the platform 12 as well as the hitching arms 30 and 32. The center arm assembly is comprised of first and second parallel tongue members 40 and 42 which are pivotally connected by means of bolts 44 and 46 respectively to the interior frame members 22 and 24, respectively. A pair of connecting braces 48 and 50 are pivotally connected to the tongue members 40 and 42 and extend rearwardly for a pivotal connection with plates 52 and 54, respectively. The plates 52 and 54 comprise a portion of the mounting assembly for the trailing wheel 38.

Trailing wheel 38 is mounted for pivotal movement about its vertical axis on a pivot shaft 56 which serves as an axle for wheel 38. Shaft 56 extends through a U-shaped wheel mount member 58. The wheel mount member 58 is coupled to the platform 12 by means of four arms 60, 61, 62 and 63 which are parallel to each other. Arms 60, 61, 62 and 63 pivotally connect the top and bottom of the wheel mount member 58 to the top and bottom of rear wheel mounting plates 65 and 67. Plates 65 and 67 are each welded to the transverse rear frame member 16. The plates 52 and 54, described above as pivotally connected to braces 48 and 50, are welded to the arms 61 and 63 respectively. Since the connecting braces 48 and 50 are pivotally attached to the plates 52 and 54, the plates 52 and 54 operate in a manner of a bell crank to transmit the vertical motion of the trailing wheel 38 to the platform 12. Alternatively a hydraulic cylinder may be connected between diagonally opposite pivot points of the parallelogram formed by arms 60, 62, 62 and 63.

The three-point hitch mechanism and linkage of braces as described may operate to maintain the platform 12 in a substantially level position in respect to the earth when properly connected with a hitch on the tractor. Thus, the depth of penetration of tools in the earth beneath the frame 12 may be maintained at a substantially constant level regardless of the placement of the tool beneath the platform 12 and regardless of the contour of the terrain. Moreover when the platform 12 and attached implements are raised behind the tractor during transportation to and from fields, for example, the three-point hitch and the linkage through braces 48 and 50, and arms 60, 61, 62 and 63 to wheel 38 causes wheel 38 to be extended downwardly. This in turn raises and supports the rear end of the platform 12. As stated before, the vertical position of the wheel 38 can be altered by means of an appropriately positioned hydraulic cylinder also. Upon expansion or contraction of the cylinder, the vertical position of wheel 38 in relation to the platform 12 could be altered.

The trailing wheel 38 cooperates with a pair of forward wheels 70 and 72 when the platform 12 is lowered. The forward wheels 70 and 72 are attached to the transverse front frame member 14 by means of bracket attachments 74 and 76, respectively, which include adjustment cranks 78 and 80, respectively. The cranks 78 and 80 are operable to adjust the height of the forward wheels 72 and 70. The wheels 70 and 72 serve primarily as a means for driving a fertilizer applicator as will be described below.

In the embodiment shown in FIGS. 1, 2 and 3, a chisel plow 82 is shown attached to the transverse front frame member 14. The chisel plow 82 is more fully illustrated in FIG. 4 and will be described in greater detail below. A colter 86 having a colter support rod 88 is positioned directly in front of the chisel plow 82. The rod 88 is bolted onto the bracket 84 in a manner more fully described below. In the presently described embodiment, a pair of wet or dry fertilizer applicators are also provided for discharging fertilizer into the earth behind the chisel plows 82. Each dry fertilizer applicator is comprised of a storage tank 90 which is mounted on the interior transverse frame members 26 and 28 and is driven through a linkage which derives its driving force from the forward wheels as at 72.

A sprocket 92 is attached to the wheel 72 to dirve a chain 94. Chain 94, in turn, engages a second sprocket 96 on an idler axle 98. Another sprocket 100, also mounted on the axle 98, operates a second drive chain 102 to drive a fertilizer dispensing sprocket 104 for the tank 90. In the drive chain arrangement rollers as at 103 prevent drive chains 94 and 102 from engaging or rubbing against transverse frame members as at 14 and 26. Fertilizer feeds down through a discharge tube 106 through openings 109a, 109b, and 109c and into the area created behind the chisel plow 82. The discharge end of the discharge tube 106 is fastened by means of clips as at 108 to the chisel plow 82. Note that fertilizer is preferably discharged only behind the forward chisel plows 82 which define the rows for the planting of seeds.

Positioned behind each chisel plow 82 and attached to transverse frame members 26 and 28 respectively are bedders as at 110 and 112 respectively. The bedders 110 and 112 are illustrated more fully in FIG. 6. The bedders 110 and 112 are mounted to create a mound or bed of soil preferably trapezoidal in cross section immediately behind the fertilized row plowed by the chisel plow 82. Mounted on the rear frame member 16 substantially the same way as the bracket 84 for the front chisel plow 82 is a second set of chisel plows as at 114. Chisel plows 114 are arranged to dig and agitate the soil between the rows defined by the front chisel plows 82. Fertilizer is generally not provided for rows defined by chisel plows 114.

Referring now to FIGS. 4–8, there is shown in greater detail some of the tools which may be attached to the frame 12 to provide varying farm operation. For example, in FIG. 4 a chisel plow 82 is illustrated having a fertilizer discharge tube 106 attached thereto by means of clips 108. The chisel plow 82 includes a front blade member 116 which is attached to an arcuate plow shank 118. The shank 118 is bolted to the bracket 84.

The bracket 84 includes an upper mounting plate 120 and a lower mounting plate or channel 122 which cooperate with mounting bolts 124 to hold the bracket 84 in position as on frame member 14. The plate 122 is formed in the shape of an inverted channel and includes a pivot rod 126 extending between the sides of the channel. The chisel plow 82 is bolted to a bracket 128 mounted on this rod 126. A portion of the bracket 128 extends forward and is connected with a rod 130 which is biased by a spring 132. Thus, if the plow 82 should meet any resistance in the soil such as a rock, it will simply pivot about the rod 123 against the biasing force resulting from the spring 132. The chisel plow 82 will normally be kept in position for tilling the soil. However, in those instances when the soil cannot be tilled, the plow 82 will tip out of the way.

More particularly, discharge tube 106 is smaller in cross section or diameter than plow 82 and contains a plurality of openings 109a, 109b, and 109c positioned and sized to distribute the fertilizer in varying quantities in the channel formed by chisel plow 82. These openings are typically symmetrically placed on either side of tube 106 so as to discharge fertilizer on both sides of the channel. Tube 106 is usually sealed at the bottom. However, only one opening at a given level is also suitable. Preferably, the majority of the fertilizer is placed at a depth of about 12 inches to 18 inches below the top of the mound by discharging the fertilizer through the lowermost opening of tube 106. For example, about 10%–30% of the fertilizer can be discharged at a 3 inches to 4 inches depth through opening 109c, 10%–30% of the fertilizer is deposited at about a 8 inches to 12 inches depth through opening 109b, and 50%–70% is deposited at about a 14 inches to 18 inches depth through opening 109a. The exact amount expelled through each opening is controlled by the size of each opening.

In the case of the application of liquid fertilizers, discharge tube 106 is simply a hollow conduit having the desired openings placed therein. In the case of solid fertilizers, it has been discovered that the desired fertilizer distribution is best obtained by the creation of baffle 180 (FIG. 11) within the tube which partially occludes the inside of the tube and serves to divert a portion of the solid fertilizer out the superjacent opening. This baffle arrangement can be separately installed baffle or, in a preferred embodiment, it is simply created by pushing in the metal displaced by the creation of openings 109a, etc. The baffle is usually used only on the upper openings 109b and 109c since lower opening 109a has the benefit of the sealed end of the tube 106. However, it can be placed adjacent opening 109a as illustrated in FIG. 11.

Attached at the front end of the bracket 84 is a colter plate 134. The colter plate 134 is held against a second plate 136 welded to the end of the channel or mounting plate 122. Thus, a colter 86 of the type shown in FIG. 5 can be easily attached in position in front of the chisel plow 82 in order to cut into the soil to thereby ease entry of the chisel plow 82 into the soil for plowing or tilling. The colter also serves to cut and slice trash to keep the chisel plow shank and bracket 84 from becoming clogged with debris or trash. In FIG. 5 it will be seen that the colter 86 includes a disc 87 mounted on a colter rod 88.

FIG. 6 illustrates a bedder 110 which includes a pair of parallel discs 144 and 146, the inside disc 146 (i.e., the disc most nearly adjacent the top of a bed which is being formed) being two or three inches less in diameter than the outside disc 144. The discs 144 and 146 are rigidly connected to the opposite ends of a shaft 148. A mounting rod 150 is attached to the center of the shaft 148. Rod 150 is then mounted on a transverse rod as at 26 or 28 of platform 12. The bedders as at 110 operate in tandem to provide a symmetrical soil bed. The discs 144 and 146 are mounted at an angle to throw soil from the edges of a row toward the center to form a bed, without mixing the fertilizer and soil together.

FIG. 7 illustrates a cultivator sweep which includes a wedge-shaped, plow-type blade 137 having faces as at 138 and 140 adapted to breakdown a mound of dirt. The blade 137 is mounted on rod 142. Rod 142 provides means for attachment of the cultivator sweep to the platform 12. The cultivator sweep is designed to break the surface of soil forming a bed and also to cut any weeds which may have grown on the bed.

FIG. 8 illustrates a typical unit planter which may be mounted on one of the transverse members of the platform as at 16 by means of a bracket as at 152. The planter includes a plow blade as at 156 to gouge out a section of the soil beneath the platform 12, whereupon seed is delivered from a seed bit 158. The additional mechanism and hoppers serve to deliver start fertilizer or herbicides to the region adjacent the seed and also insures coverage of the seed by a proper amount of soil.

In operation then, any one of the farm tools such as shown in FIGS. 4–8 may be arranged on the platform 12 to achieve the desired farming operation or sequence of farming operations. For example, in FIG. 9, there is shown in a schematic diagram the farming operations that would be performed for fall plowing and soil preparation. The leading chisel plows 82 define the planting rows and are set to till the soil, for a predetermined depth. This fertilizer depth is a function of the exact crop to be planted and can vary from more than 6 inches to 18 inches. For example, the preferred depth for corn and milo is 10 inches to 18 inches. For soybeans, the preferred depth for limestone is 8 inches to 14 inches.

Fertilizer is dispensed in the lower part of the trough created by the leading chisel plows 82. The bedders as at 110 and 112 are mounted on the same platform 12. They form a bed of earth over the row traversed by the chisel plows 82 without substantially admixing the fertilizer with the soil that fills the channel and forms the bed of earth. At this point, the fertilizer as at 160 is now below the top of the bedded mound for reaction with the soil during the winter. This is illustrated by comparing the original grade 162 of the soil with the height of bed. Because of the operation by the bedders 110 and 112, no fertilizer is deposited at or near the surface of the ground to fertilize weeds. The fertilizer is maintained deeply within the earth available for use the following spring. When using the implement illustrated, the trough is formed, fertilizer placed therein, and the trough filled to form the bed or mound substantially simultaneously in close serial order. Preferably, bedders 110 and 112 (also commonly referred to as "ridgers") form a bed or mound approximately trapezoidal in cross section with a base of about 24 inches, a top of about 12 inches and a depth of about 10 inches to 12 inches. The exact dimensions can vary slightly with the row spacings and the type of crop planted.

Also mounted on the rear of the same platform 12 are rear chisel plows 114 which plow in the region intermediate the rows formed by the forward chisel plows 82. Thus, the fall plowing operation is accomplished by a single pass at a field. Simultaneously, the grade of the earth is changed so that rows are provided for the spring planting. Importantly, fertilizer is maintained at a sufficient depth within those rows and is not mixed with the soil to provide nutrients for weeds. In addition, when the fertilizer is initially placed, the concentration at the bottom of the trough created by the chisel plow is very high and serves to "poison" and kill the then existing weeds and insects thereby further lowering the possibility of weed growth in the spring. However, by the time spring planting takes place, the fertilizer has reacted sufficiently with the soil and does not affect the desired crop seed. The original grade of the field as indicated by the dotted line 162 has been altered when the method of this invention is first utilized as indicated schematically in FIG. 9 whereby the beds or mounds are created for planting in the following spring. In subsequent years, the same basic mound structure is maintained subject to minor reshaping, fertilization and seed planting. The troughs between beds are used for water runoff, water retention, and vehicle wheels.

FIG. 10 represents the farm operations that take place in the spring. Originally, the bed formed the preceeding fall as at 164 will have eroded somewhat and some weeds may have begun to grow on the bed 164 but the bed will still have the same basic shape. However, the fertilizer 160 is still retained beneath the bed 164. Because the bed provides a mound with at least three sides exposed to the sun, spring rains drain more efficiently from the field and the beds dry quickly for earlier planting. This is a significant economic advantage of the present invention since it allows the farmer to plant his crops earlier. In the spring planting operation, a cultivator 166 is attached to the platform 12 for the first operation of the combination farm tool. The cultivator sweep 166 breaks down the top and sides of bed 164 to break the crust formed during the winter and for preparation for planting and removal of weeds. Following the cultivator sweep 166 the bedders 110 and 112 reform the bed broken down by the cultivator sweep 166. At the same time, herbicides may be applied. It should be noted that the amount of herbicides required will be much less than would be required for the prior art spring fertilization and planting. After the bedders 110 and 112, a planter as at 168, operates to plant the seeds 170 at an appropriate depth, for example, four inches for corn. Since the surrounding soil was completely broken when the fertilizer was placed in the soil, the roots of the germinated seed will readily progress to the fertilizer source. Thus, by appropriate arrangement of the cultivator sweep 166, bedders 110 and 112 and planters 168, the planting operation is accomplished by a single pass at a field during spring planting.

The seed planting is done in the spring in a conventional manner with the seed row being carefully centered substantially over the fertilizer. It should be noted that since the mound or bed has been preformed, no markers are needed on the planter. In an alternative embodiment, a double row of seed planting can be performed with the fertilizer row dividing each seed row or, two rows of fertilizer can be used with a row of seeds dividing each fertilized row.

Advantageously, the fertilizer 160 placed in the ground the previous fall remains below the grade and below the planting level of the seed 170. Preferably, the fertilizer is at least 4 inches below the planting level and preferably about 6 to 15 inches below the planting level. The seeds, even though the fertilizer has had an opportunity to react with the soil, should not be placed directly in contact with the bottom of the previous fertilizer bed since extreme fertilizer concentrations will stunt, and even kill, the germinating seed. However, the seeds will not be as sensitive to the fertilizer as when the seeds and fertilizer are placed simultaneously. The fertilizer 160 placed at the bottom of the mound is thus available for feeding the plant resulting from growth of the seed 170. In fact, the seeding roots will follow the fertilizer gradient created and rapidly descend to a deep level where additional fertilizer and water is plentiful. At the same time, the fertilizer 160 is at a sufficient depth so that it will not accelerate the growth of weeds or seeds on or very near the soil surface. In addition, the bed tends to maintain moisture at low levels near the working surface but at high levels at root level. The plants thus have strong root systems and produce better crops. Also, because of the moisture and fertilizer available, germination is benefited by the bed formation which insures that the sun will contact the greater surface area of the seeded beds.

It should be noted that herbicide applicators, liquid or solid, fertilizer applicators or cultivators may be incorporated on the platform 12 in either the fall or the spring operation. In addition, cultivators or bedders or any combination thereof can be utilized for cultivating a crop once it has sprouted. The variation of operations is almost infinite depending upon the desires and requirements of a particular farmer. An important feature is the fact that a single platform as at 12 can be adjusted by merely moving or altering the position of attachments on the platform 12 for substantially all farming operation. It can be appreciated the inventory of farm implements will be greatly reduced in practicing this invention with the implement illustrated as well as eliminating the necessity for making numerous passes over a field which is to be tilled.

For example, it is estimated that the single implement invention of the present invention can save a farmer 30%–40% in comparison to the numerous pieces of tillage equipment he now uses. As importantly, the single implement device, since it performs several tillage steps substantially simultaneously in close serial order in a single pass, less cultivation time is required. In a particular example, a farmer tilling his fields in a conventional flat farm method must make at least seven passes over his field to harvest and plant a new crop. In the fall, in separate passes over the field, he will combine or otherwise harvest the crop, shred, disc, fertilize and then plow. In the spring, he will again disc the field one to three times and then plant the crop seed. In contrast, by using the apparatus of the present invention, the farmer need only make three to four passes over the field. In the fall, he harvests the crop and then removes trash, performs discing, places fertilizer and otherwise reshapes the bed to its desired condition as in the previous fall in a single step. In the spring, he then, in a single pass, can disc and plant seeds in the mound. If he desires, this pass could be preceded by a weed removal and insect removal pass with appropriate equipment, herbicides and insectisides.

Instead of using the implement illustrated herein, conventional shredders, plows, fertilizer applicators, bedders, cultivators, and planters can be utilized. Accordingly, the present method of farming can be performed without any special equipment.

The bed formed in the present invention provides a large surface to sunlight and also provides an adjacent roadway or path between beds for the equipment to ride on. As a consequence, there is no packing of the ground area where crops are grown. Further, the path area between beds provides an area for heavy rains to gather and gradually run off and/or be absorbed without damage to the crops.

This method of farming allows the farmer to keep the same bed in the same relative position in the field year after year and avoid the need for ground packing. Further, when this method is used for contour farming, natural contours will be formed, typically every 30 inches to 40 inches. As a consequence, rainfalls of 4 inches to 6 inches can be safely held on and drained from the slopes. This improved drainage enables the farmer to get in his field earlier in the spring and allows him to harvest his crop with little difficulty in the fall. In certain instances the farmer can plant his crops 2 to 6 weeks before farmers farming on flat land and he can harvest his crops in the fall when other farmers on flat land cannot get into their fields.

A significant benefit obtained by the present method of farming is that there is obtained a reduction in the amount of fertilizer and herbicide required. Since the fertilizer is buried deep in the soil, there will be no fertilizer runoff during large rainfalls. Further, since there is little, if any, fertilizer near the surface, weeds will not flourish and can be easily controlled. As a result, herbicides will be particularly effective in controlling weeds because of the lack of food for weed growth. It should also be noted, that the amount of weeds which are present decline each year the present method is utilized so that the amount of herbicides required similarly decline.

Since the weeds are effectively controlled and the fertilizer is used exclusively by the crops, better crops and yields result. Also, since all the fertilizer is used by the desired crops and none is lost due to runoff with rainwater, up to 50% less fertilizer is required to obtain a given yield. Therefore, the present method lowers the amount of fertilizers and herbicides needed and helps preserve our environment.

The benefits to be obtained when using the method of the present invention are best illustrated by the following examples which are not to be construed as limiting on the generally broad scope of the claimed invention.

EXAMPLES

Example 1

In this example corn was grown in experimental plots with ten inch plant spacing and forty inch row spacings by using both deep fertilization and conventional surface fertilization techniques. In the case of the deep fertilization plot, the fertilizer was placed in rows 10 inches to 12 inches high, 16 inches to 18 inches deep at the base and 8 inches to 12 inches wide at the top at a depth of 16 inches in the fall. In the spring the corn was planted at a depth of 2 inches. In the surface fertilization plot, the fertilizer was spread on the ground in in the fall and worked into the soil in a conventional manner. The corn was then planted at a depth of 2 inches in the spring.

In a specific example, an experimental plot used the surface method of fertilization for 2 years and was then switched to the deep fertilization method. Meanwhile, an adjacent control plot was maintained under surface fertilization condition to determine the effects, if any, of climate variables. The results obtained are presented in Table 1.

TABLE 1

| | Year: 1 | 2 | 3 | 4 | 5 |
|---|---|---|---|---|---|
| Yield before utilizing deep fertilization (bushels per acre.) | 105 | 112 | — | — | — |
| Fertilizer Used (spread on ground, worked in by plowing; lb/acre) | 450 | 450 | — | — | — |
| Yield After utilizing deep fertilization (bushels per acre.) | — | — | 123 | 128 | 133 |
| Fertilizer used (placed in channel; lb/acre) | — | — | 300 | 275 | 250 |
| Yield from control plot, bushel/acre (Fertilizer spread on ground, worked in by plowing; 450 lb/acre). | 107 | 110 | 113 | 115 | 112 |

Table 1 clearly illustrates the benefit of deep fertilization. When the plot was switched from surface fertilization to deep fertilization an average increase in yield of more than 10 percent was obtained while the amount of fertilizer used decreased by an average of about 40 percent. In addition, there was substantially less weed growth on the deep fertilized plot. As can be seen from Table 1, this increase was due solely to the deep fertilization method and not climatic variables since the yields from the control plot remained relatively constant.

Example 2

In this example, in the fall, limestone was placed by the deep fertilization method at a depth of about 16 inches in rows similar to those described in Example 1. These rows had been used to grow milo the previous 2 years. The next spring soybeans were planted at a rate of six per foot in the top of the rows at a depth of about 1.5 inches. These rows produced a yield of 49 bushels/acre in a plot where one row of soybeans were planted per row and a yield of 54 bushels/acre where two rows of soybeans were planted per row. In contrast, a virgin flat land plot that had not been farmed or fertilized the previous years where soybeans were planted at the same row and plant spacings with conventional surface techniques and the identical limestone amounts, yielded only 28 bushels/acre.

Further, deep placement of limestone in the rows required only 500 pounds of limestone every 3 years in a plot where soybeans were planted every third year. In contrast, in an adjacent plot where soybeans were planted every fourth year, 3 tons (6,000 pounds) of limestone spread over the surface of the plot by conventional techniques were required to produce yields substantially equal to the plot utilizing deep placement of the limestone in rows. This represents a time averaged limestone saving of almost a factor of 10.

I claim as my invention:

1. An improved method of farming and soil tillage of soil containing crop trash and residue comprising the seasonal steps of:
   a. in the fall chopping and shredding the crop trash residue present on the soil and forming a plurality of substantially parallel spaced mounds each mound having a substantially trapezoidal cross section and a deep channel in the mound;
   b. placing a plant food additive in the bottom of said channel by,
      i. depositing about 10%–30% of said additive at a depth of about 3 inches to 4 inches below the top surface of the mound;
      ii. depositing about 10%–30% of said additive at a depth of about 8 inches to 12 inches below the top surface of the mound; and
      iii. depositing about 50%–70% of said additive at a depth of about 14 inches to 18 inches below the top surface of the mound;
   c. filling said channel with soil without admixing the soil and the plant additive and maintaining a mound of dirt over said channel, said mound extending above the normal grade of soil; and
   d. in the spring, breaking any crust formed on the mound during the winter and planting seeds in the top of said mound of dirt substantially directly above said plant additive a spaced-apart distance.

2. A method according to claim 1 wherein said plant food additive is fertilizer.

3. A method according to claim 1 wherein said plant food additive is limestone and the seeds are soybeans.

4. A method according to claim 1 wherein said steps are performed with a single, combination low tillage farm implement having mounted thereon equipment necessary to affect said steps.

5. A method according to claim 1 wherein a herbicide is applied to said dirt mound in the spring to control weed growth.

6. A method according to claim 1 wherein said channel is formed, fertilizer placed therein and filled with soil to form said mound substantially simultaneously in serial order.

7. A method as in claim 1 wherein the fertilizer is distributed over the depth of said channel with the majority of the fertilizer deposited at the bottom thereof.

8. A method as in claim 1 wherein the same basic mound is used for crops from year to year.

* * * * *